United States Patent Office 3,413,296
Patented Nov. 26, 1968

3,413,296
CERTAIN 11-(3-TROPANYLOXY)-6,11-DIHYDRO-DIBENZO[b,e]THIEPIN DERIVATIVES
Ernst Jucker, Ettingen, Adolf Lindenmann, Basel, and Fulvio Gadient, Birsfelden, Switzerland, assignors to Sandoz Ltd. (also known as Sandoz A.G.), Basel, Switzerland
No Drawing. Filed June 21, 1966, Ser. No. 559,100
Claims priority, application Switzerland, June 28, 1965, 9,025/65; Mar. 24, 1966, 4,286/66
3 Claims. (Cl. 260—292)

ABSTRACT OF THE DISCLOSURE

The 11 - (3 - tropanyloxy) - 6,11-dihydro-dibenzo[b,e] thiepin derivatives of this invention show pronounced peripheral anticholinergic properties based on inhibitory reactions of acetylcholine and excitation of cholinergic nerves in experimental animals. They also have histamine inhibiting and moderate serotonin inhibiting properties.

The present invention relates to new tropane ethers and a process for their production.

The present invention provides 11-(3-tropanyloxy)-6,11-dihydro-dibenzo[b,e]thiepins of Formula I,

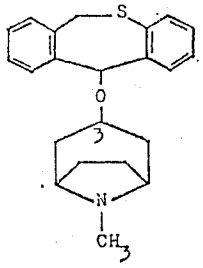

(I)

and their salts with inorganic and organic acids.

The present invention further provides a process for the production of the compounds of Formula I and their acid addition salts, characterized in that a 6,11-dihydrodibenzo[b,e]thiepin derivative of Formula II,

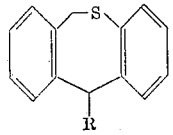

II in which R signifies a halogen atom or a sulphonyloxy radical, is reacted with a tropan-3-ol, optionally in the presence of an acid binding agent, and the resulting compound of Formula I is optionally converted into its acid addition salts with organic or inorganic acids. This process is preferably effected at 80–140° C.

It is to be understood that reference herein to the compounds I and to the tropan-3-ol starting materials includes the 3α and 3β-isomers.

One method of effecting the process of the invention consists in that a solution of a 11-halogeno-6,11-dihydrodibenzo[b,e]thiepin in an anhydrous inert organic solvent, e.g. absolute xylene, is added dropwise at a temperature of 80–140° C. to a solution of tropine or pseudotropine (tropan-3α- or -3β-ol) in the same solvent and optionally in the presence of an acid binding agent, e.g. sodium, potassium or calcium carbonate, or a tertiary organic base, e.g. triethylamine. The reaction mixture is kept at an elevated temperature for some time and the reaction product is isolated therefrom in manner known per se, e.g. by shaking out between a water immiscible organic solvent and an aqueous acid solution. Purification is effected by distillation in a high vacuum or preferably by conversion into a suitable salt.

When a 6,11-dihydro-dibenzo[b,e]thiepin, in which R signifies a sulphonyloxy radical, is used as starting material the process is preferably effected in that this compound, e.g. 11 - p - toluenesulphonyloxy - 6,11-dihydro-dibenzo[b,e]thiepin, and tropine or pseudotropine in an anhydrous inert organic solvent, e.g. absolute xylene, are heated to the boil at reflux for about ½ hour. The cooled reaction mixture is subsequently made alkaline with an aqueous dilute alkali solution and the final product is isolated therefrom in manner known per se and purified by distillation in a high vacuum and/or conversion into a salt.

The 11-sulphonyloxy-6,11-dihydro-dibenzo[b,e]thiepins used as starting materials may be produced in that 6,11-dihydro - dibenzo[b,e]thiepin - 11 - ol is treated with an organic sulphonic acid halide, e.g. p-toluenesulphonyl-chloride, p-bromobenzenesulphonyl-bromide, methanesulphonyl-chloride, in a suitable organic basic solvent, e.g. pyridine, or a lower trialkylamine, at a temperature of 0–50° C., preferably at room temperature, for 1 to 24 hours. The reaction may also be effected in an inert organic solvent with the addition of the calculated amount of pyridine or trialkylamine. The solvent is then distilled off in a vacuum, whereupon it is advantageous to add water to remove the solvent completely and the reaction mixture is subjected to an azeotropic distillation.

Starting materials of Formula II, in which R signifies chlorine, bromine or iodine, may be obtained in that 6,11-dihydro - dibenzo[b,e]thiepin - 11 - ol is dissolved in an anhydrous inert organic solvent, e.g. absolute benzene, and a stream of hydrogen chloride, hydrogen bromide or hydrogen iodide is passed through this solution whilst cooling with ice. After drying the benzene solution, e.g. over calcium chloride, and subsequent filtration, the solvent and excess hydrogen halide are removed at reduced pressure, preferably in an atmosphere of nitrogen, whereby the desired 11-chloro-, 11-bromo- or 11-iodo-compound is obtained as residue. The 11-iodo-derivative may also be produced from the 11-bromo-compound by reacting with sodium iodide in acetone.

11-fluoro - 6,11 - dihydro-dibenzo[b,e]thiepin is advantageously obtained by treating 11-chloro- or 11-bromo-6,11-dihydro-dibenzo[b,e]thiepin with a metal fluoride, e.g. silver fluoride, mercury(II)fluoride or antimony trifluoride. This compound may, however, also be obtained from the 11-toluenesulphonyloxy-compound described above by reacting with potassium fluoride in a high-boiling solvent, e.g. diethylene glycol.

Compounds I are viscous oils at room temperature; with inorganic and organic acids they form stable salts which are crystalline at room temperature. Examples of acids for acid addition salt formation with compounds I are: hydrochloric, hydrobromic, methanesulphonic, oxalic, tartaric, malic, maleic, fumaric, citric and benzoic acid.

The compounds of the invention show pronounced, predominantly peripheral anticholinergic properties. In tests effected with animals they inhibit the reactions produced by acetylcholine and by the excitation of cholinergic nerves. Furthermore, they have a distinct histamine inhibiting and a moderate serotonin inhibiting effect. They are also characterized by the typical effects of antidepressives.

Compounds I are indicated for use in the treatment of disorders occurring as a result of an increased vagotonus, e.g. spasms of the smooth muscles of the bronchial, gastrointestinal and urogenital tract, hypersecretion and bradycardia. They may also be used in the treatment of allergies of various origins and in the ambulant and stationary therapy of depressive conditions and psychosomatic disorders.

A suitable daily dosage is from 0.1 to 10 mg.

The compounds of the invention may be used as pharmaceuticals on their own or in the form of appropriate medicinal preparations for administration, e.g. enterally or parenterally. In order to produce suitable medicinal preparations the compounds are worked up with inorganic or organic adjuvants which are inert and physiologically acceptable. Examples of such adjuvants are:

For tablets and dragees—lactose, starch, talc and stearic acid,

For injectable solutions—water, alcohols, glycerin and vegetable oils,

For suppositories—natural or hardened oils and waxes.

The preparations may furthermore contain suitable preserving, stabilizing and wetting agents, solubilizers, sweetening and colouring substances and flavourings.

The term "in manner known per se" as utilized herein designates methods in use or described in the literature on the subject.

In the following non-limitative examples all temperatures are indicated in degrees centigrade; the melting and boiling points are uncorrected.

Example 1—11-(3α-tropanyloxy)6,11-dihydro-
dibenzo[b,e]thiepin 7.3 g. of thionyl chloride are added to 14.0 g. of 6,11-dihydro-dibenzo[b,e]thiepin-11-ol in 40 ml. of absolute xylene and heating is effected to 70° for one hour. After cooling to room temperature, 3.0 g. of calcium chloride are added and the xylene phase is filtered in the absence of moisture. The xylene phase is subsequently added dropwise during the course of 15 minutes to a boiling mixture of 8.6 g. of tropine (tropan-3α-ol) and 24.6 g. of sodium carbonate in 50 ml. of absolute xylene. The reaction mixture is heated at reflux for 6 hours and after cooling, is diluted with 200 ml. of diethyl ether and shaken out twice, each time with 100 ml. of water. The organic phase is extracted with 100 ml. of N hydrochloric acid, the hydrochloric acid extract is made alkaline with 2 N sodium hydroxide and shaken out thrice, each time with 300 ml. of diethyl ether. After drying the ether extract over sodium sulphate, concentration is effected and the oily residue is distilled, whereby 11-(3α-tropanyloxy)6,11-dihydro-dibenzo[b,e]thiepin distils at 190–200° and 0.02 mm. of Hg.

The salts are produced in that a molar amount of the desired acid in ethanol is added to a solution of the base in ethanol and the salt which crystallizes is filtered off.

Acid oxalate: melting point 207–210° from ethanol.
Acid succinate: melting point 188–190° from ethanol.
Acid maleate: melting point 180–182° from ethanol.
Acid malate: melting point 188–190° from ethanol.
Acid fumarate: melting point 234–236° from ethanol.
Methanesulphonate: melting point 207–209° from ethanol.
Acid citrate: melting point 168–169° from ethanol.

Example 2—11-(3α-tropanyloxy)6,11-dihydro-
dibenzo[b,e]thiepin

A stream of hydrogen chloride is passed through a suspension of 45.4 g. of 6,11-dihydro-dibenzo[b,e]thiepin-11-ol in 80 ml. of absolute benzene whilst cooling with ice during the course of 10 minutes. 10 g. of calcium chloride are subsequently added, filtration is effected after 5 minutes and the solvent is removed at 14 mm. of Hg in an atmosphere of nitrogen. The residue is then dissolved in 120 ml. of absolute xylene and this solution is added dropwise during the course of 10 minutes to a boiling solution of 28.2 g. of tropine in 100 ml. of absolute xylene. The reaction mixture is subsequently heated to the boil at reflux for one hour, is then cooled to room temperature and taken up in 200 ml. of ether and 200 ml. of water. After the addition of 10 ml. of 2 N hydrochloric acid, the aqueous phase is separated, is made strongly alkaline with 2 N sodium hydroxide and shaken out thrice, each time with 150 ml. of ether. After drying ether extract over magnesium sulphate and purifying over animal charcoal, the solvent is distilled off and the crude, oily 11-(3α-tropanyloxy)-6,11-dihydro-dibenzo[b,e]thiepin is converted into the acid oxalate without further purification. Melting point 207–210° from ethanol.

Example 3—11-(3α-tropanyloxy)6,11-dihydro-
dibenzo[b,e]thiepin

A stream of hydrogen bromide is passed through a suspension of 10.0 g. of 6,11 - dihydro - dibenzo[b,e]thiepin-11-ol in 50 ml. of absolute benzene whilst cooling with ice during the course of 15 minutes. 2 g. of calcium chloride are subsequently added, filtration is effected after 5 minutes and the solvent is removed at 14 mm. of Hg in an atmosphere of nitrogen, whereby 11-bromo-6,11 - dihydro - dibenzo[b,e]thiepin crystallizes; melting point 110–112° from chloroform/pentane.

8.7 g. of 11-bromo-6,11-dihydro-dibenzo[b,e]thiepin are dissolved in 50 ml. of absolute xylene and added dropwise to a boiling solution of 4.2 g. of tropine in 50 ml. of absolute xylene during the course of 5 minutes. The reaction mixture is heated to the boil at reflux for one hour, is subsequently cooled to room temperature and worked up in a manner analogous to that described in Example 2. Acid oxalate: melting point 207–210° from ethanol.

Example 4.—11-(3β-tropanyloxy)-6,11-dihydro-
dibenzo[b,e]thiepin

A stream of hydrogen chloride is passed through a suspension of 11.35 g. of 6,11-dihydro-dibenzo [b,e]thiepin-11-ol in 40 ml. of absolute benzene for 5 minutes whilst cooling with ice. 3 g. of calcium chloride are subsequently added, filtration is effected after 5 minutes and the solvent is removed at 14 mm. of Hg in an atmosphere of nitrogen. The oily residue is dissolved in 80 ml. of absolute xylene and this solution is added dropwise during the course of 5 minutes to a boiling solution of 7.1 g. of pseudotropine (tropan-3β-ol) in 50 ml. of absolute xylene. The reaction mixture is heated to the boil at reflux for one hour and the crystalline precipitate, the hydrochloride of the compound mentioned in the heading, is filtered off whilst hot. The salt is washed twice, each time with 30 ml. of benzene and then twice, each time with 20 ml. of ethanol, and dried. Melting point 273-278°.

Acid maleate: melting point 175–177°.
Acid succinate: melting point 162–165°.
Acid fumarate: melting point 207–209°.

Example 5.—11-(3α-tropanyloxy)-6,11-dihydro-
dibenzo[b,e]thiepin

A solution of 11.3 g. of 6,11-dihydro-dibenzo[b,e]thiepin-11-ol and 10.5 g. of p-toluenedisulphonyl chloride in 50 ml. of absolute pyridine is stirred at room temperature for 5 hours. The pyridine is subsequently distilled off at 15 mm. of Hg and is completely removed azeotropically whilst adding water thrice, each time 100 ml. The residue s subsequently dissolved in 50 ml. of choloroform and the solution shaken out thrice, each time with 50 ml. of water. After drying over magnesium sulphate, the volume of the chloroform solution is somewhat reduced and ether is added, whereby the p-toluenesulphonic acid ester of 6,11-dihydro-dibenzo[b,e]thiepin-11-ol crystallizes with 1 mol of pyridine of crystallization. Melting point 178–184°.

9.2 g. of the ester obtained above and 2.8 g. of tropine are then heated to the boil at reflux in 50 ml. of absolute xylene for ½ hour, the solution is subsequently cooled to room temperature and 40 ml. of N sodium hydroxide solution are added thereto. The xylene phase is then separated and the aqueous phase is shaken out twice, each time with 30 ml. of ether. The combined xylene and ether extracts are washed with water until neutral, dried over magnesium sulphate and purified over animal charcoal. After distilling off the solvent, the crude oily 11-(3α-tropanyloxy)6,11-dihydro-dibenzo[b,e]thiepin is converted as such into the acid succinate. Melting point 188–190° from ethanol.

What we claim is:

1. A compound selected from the group consisting of a compound of formula,

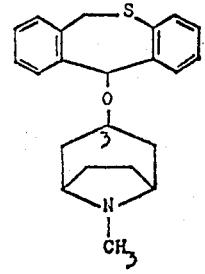

and therapeutically acceptable acid addition salts thereof.

2. A compound according to claim 1 in which the compound is 11-(3α-tropanyloxy)-6,11-dihydro-dibenzo[b.e]thiepin.

3. A compound according to claim 1 in which the compound is 11-(3β-tropanyloxy)-6,11-dihydro-dizenzo[b,e]thiepin.

References Cited
FOREIGN PATENTS 988,291    4/1965    Great Britain.
  4,185    5/1966    France.

HENRY R. JILES, *Primary Examiner.*

A. L. ROTMAN, *Assistant Examiner.*